US012745747B2

(12) United States Patent
Dudley

(10) Patent No.: US 12,745,747 B2
(45) Date of Patent: Sep. 29, 2026

(54) PET TRAINING PAD DEVICE WITH ODOR APPLICATOR

(71) Applicant: PERITAS BRANDS, LLC, Niceville, FL (US)

(72) Inventor: Charles Weston Dudley, Destin, FL (US)

(73) Assignee: PERITAS BRANDS, LLC, Niceville, FL (US)

(*) Notice: Subject to any disclaimer, the term of this patent is extended or adjusted under 35 U.S.C. 154(b) by 0 days.

(21) Appl. No.: 18/980,862

(22) Filed: Dec. 13, 2024

(65) Prior Publication Data

US 2026/0165288 A1 Jun. 18, 2026

(51) Int. Cl.
*A01K 1/015* (2006.01)

(52) U.S. Cl.
CPC ................................ *A01K 1/01577* (2025.08)

(58) Field of Classification Search
CPC ............................ A01K 1/0107; A01K 1/0157
See application file for complete search history.

(56) References Cited

U.S. PATENT DOCUMENTS 3,752,121 A * 8/1973 Brazzell ............... A01K 1/0107 119/169
4,800,677 A * 1/1989 Mack ................... A01K 1/0107 294/1.3
7,249,570 B1 * 7/2007 Roberson ............. A01K 1/0157 119/169
9,271,473 B2 * 3/2016 Ryu ..................... A01K 1/0152
10,274,433 B1 * 4/2019 Betts-Lacroix ........ G01N 21/78
11,771,049 B2 * 10/2023 Axelrod .................... B32B 3/08 119/161
2011/0139082 A1 * 6/2011 Blagden ............... A01K 1/0107 119/171
2016/0183492 A1 * 6/2016 Norman ............... A01K 1/0114 119/166
2017/0013799 A1 * 1/2017 Bolton ................. A01K 1/0155
2018/0338468 A1 * 11/2018 Takahashi ............ A01K 1/0157
2020/0214261 A1 * 7/2020 D'Anna ............... A01K 27/008
2024/0251755 A1 * 8/2024 Charpentier ......... A01K 1/0353
2025/0072387 A1 * 3/2025 van Meer ............ A01K 1/0157

OTHER PUBLICATIONS

How To Get Your Puppy To Stop Ripping Up Their Potty Pads by Lindsay Pevny, URL: https://web.archive.org/web/20200926092932/https://littledogtips.com/puppy-chews-up-potty-pads/ (Year: 2020).*
WikiHow, How to Potty Train a Puppy, URL: https://web.archive.org/web/20240225101151/https://www.wikihow.com/Potty-Train-a-Puppy (Year: 2024).*

* cited by examiner

*Primary Examiner* — Magdalena Topolski
*Assistant Examiner* — Edgar Reyes
(74) *Attorney, Agent, or Firm* — Renner, Otto, Boisselle & Sklar, LLP

(57) ABSTRACT

A pet training pad device may include a pad body and an odor applicator removably attached to the pad body. The pad body may have an absorbent layer for absorbing a target odor from a target substance. The odor applicator may have an odor transfer layer for transferring the target odor to the pad body. The odor applicator may be configured to be removed from the pad body, collect the target substance on the odor transfer layer, and contact the absorbent layer of the pad body to transfer the target odor from the target substance to the absorbent layer of the pad body.

18 Claims, 17 Drawing Sheets

PET TRAINING PAD DEVICE WITH ODOR APPLICATOR

FIELD

The present disclosure generally relates to pet products. More particularly, the present disclosure relates to a pet training pad device having a removably attached odor applicator.

BACKGROUND

Pet waste collection pads, commonly referred to as "potty sheets" or "training pads," are widely used for indoor pet waste management, particularly for dogs. These pads typically consist of an absorbent layer designed to soak up liquid waste and a waterproof backing to prevent leakage onto floors. Despite the convenience offered by these products, pet owners often face significant challenges when training pets to consistently use the pads. One of the primary difficulties is encouraging the pet to associate the pad with a designated elimination area, especially in cases where pets are accustomed to outdoor environments or have not been previously trained to use such pads. Pets may avoid the pad, exhibit inconsistent behavior, or use it incorrectly, leading to accidents outside the intended area. Additionally, the scent, size, and placement of the pad can greatly influence a pet's willingness to use it, with some pets showing reluctance or confusion even after extended periods of training. These challenges highlight the need for improved design solutions to make pet waste collection pads more effective and easier to use for both pets and owners.

SUMMARY

Aspects of the disclosure relate to a pet training pad device having a pad body and an odor applicator removably attached to the pad body. The pad body may have an absorbent layer for absorbing and retaining a target odor from a target substance. As an example, the target substance may include urine produced by the pet, and the target odor may include the urine odor of the urine produced by the pet. The odor applicator may have an odor transfer layer for transferring the target odor to the pad body. For instance, the odor transfer layer may be an absorbent layer for absorbing urine that has been deposited by the pet on another surface. The odor applicator may be removed from the pad body, used to collect the target substance (e.g., from the floor or another training pad), and then brought into contact with the pad body to transfer the target odor from the target substance to the absorbent layer of the pad body. The odor applicator may be attached to a region of the pad body via an adhesive, heat stamping, or other technique. The target odor applied to the pad body may serve to encourage a pet to eliminate on the pad body, thereby reducing the occurrence of accidents and need for cleanup while facilitating pet waste elimination behavioral conditioning.

According to an aspect of the present disclosure, a pet training pad device includes: a pad body having at least an absorbent layer for absorbing a target odor from a target substance; and an odor applicator removably attached to the pad body and having at least an odor transfer layer for transferring the target odor to the pad body, wherein: the odor applicator is configured to be removed from the pad body, collect the target substance on the odor transfer layer, and contact the absorbent layer of the pad body to transfer the target odor from the target substance to the absorbent layer of the pad body.

According to an embodiment of any paragraph(s) of this summary, the target substance includes a substance produced by a pet.

According to an embodiment of any paragraph(s) of this summary, the target substance includes pet urine produced by the pet.

According to an embodiment of any paragraph(s) of this summary, the target substance is collected from a substance source located externally to the pad body.

According to an embodiment of any paragraph(s) of this summary, the substance source includes a second pad body on which the target substance has been deposited.

According to an embodiment of any paragraph(s) of this summary, the odor applicator further includes: a first surface provided with an attachment layer configured to attach to the pad body; and a second surface opposite the first surface provided with the odor transfer layer.

According to an embodiment of any paragraph(s) of this summary, the odor transfer layer is absorbent with respect to the target substance.

According to an embodiment of any paragraph(s) of this summary, the attachment layer is configured to attach to the pad body using one or more attachment techniques selected from the group consisting of: adhesives, hook and loop fasteners, polypropylene hooks, and heat stamping.

According to an embodiment of any paragraph(s) of this summary, in an initial state the first surface of the odor applicator is removably adhered to the pad body such that the attachment layer shares an interface with a lower surface of the pad body.

According to an embodiment of any paragraph(s) of this summary, in an initial state the first surface of the odor applicator is removably adhered to the pad body such that the attachment layer shares an interface with an upper surface of the pad body.

According to an embodiment of any paragraph(s) of this summary, in the initial state a longitudinal edge of the odor applicator is removably attached to a peripheral edge of the pad body along a separable interface.

According to an embodiment of any paragraph(s) of this summary, in the initial state the longitudinal edge of the odor applicator is removably attached to the peripheral edge of the pad body along a perforated interface.

According to an embodiment of any paragraph(s) of this summary, the first surface of the odor applicator is configured to be removed from the pad body along the attachment layer; the odor applicator is configured to collect the target substance on the odor transfer layer from a substance source external to the pad body; and the odor applicator is configured to be reattached to an upper surface of the pad body using the attachment layer such that the first surface of the odor applicator shares an interface with the upper surface of the pad body and the second surface of the odor applicator faces upward.

According to an embodiment of any paragraph(s) of this summary, the first surface of the odor applicator is configured to be peeled off the lower surface of the pad body along the adhesive layer; the odor applicator is configured to be separated from the pad body along the perforated interface; the odor applicator is configured to collect the target substance on the odor transfer layer from a substance source external to the pad body; and the odor applicator is configured to be attached to an upper surface of the pad body using the adhesive layer such that the first surface of the odor applicator shares an interface with the upper surface of the pad body and the second surface of the odor applicator faces upward.

According to an embodiment of any paragraph(s) of this summary, the odor applicator includes a wetness indicator configured to change color when brought into contact with the target substance.

According to an embodiment of any paragraph(s) of this summary, the odor applicator is configured to be reattached to a central region of the upper surface of the pad body after collecting the target substance.

According to an embodiment of any paragraph(s) of this summary, when reattached to the upper surface of the pad body after collecting the target substance, the odor applicator has a height in a vertical direction perpendicular to the upper surface of the pad body that achieves a predetermined height threshold.

According to an embodiment of any paragraph(s) of this summary, the odor applicator has a brightness value (L*) ranging from 0 to 100, a green-red component (a*) value of 0, and a blue-yellow component (b*) value ranging from −128 to 0 in an L*a*b color system.

According to an embodiment of any paragraph(s) of this summary, the odor applicator has a brightness value (L*) ranging from 0 to 100, a green-red component (a*) value of 0, and a blue-yellow component (b*) value ranging from 0 to 128 in an L*a*b color system.

According to an embodiment of any paragraph(s) of this summary, the pad body and the odor applicator are disposable.

According to embodiments, an aspect of the present disclosure relates to a pet training pad device use method for a pet training pad device including: a pad body having at least an absorbent layer for absorbing a target odor from a target substance; and an odor applicator removably attached to the pad body and having at least an odor transfer layer for transferring the target odor to the pad body, the pet training pad device use method including: removing the odor applicator from the pad body; collecting, using the odor applicator, a target substance on the odor transfer layer from a substance source external to the pad body; and bringing the odor applicator into physical contact with the absorbent layer of the pad body to transfer the target odor from the target substance to the absorbent layer of the pad body.

According to an embodiment of any paragraph(s) of this summary, the odor applicator further includes: a first surface provided with an adhesive layer; and a second surface opposite the first surface provided with the odor transfer layer, wherein in an initial state the first surface of the odor applicator is removably adhered to the pad body such that the adhesive layer shares an interface with a lower surface of the pad body.

According to an embodiment of any paragraph(s) of this summary, bringing the odor applicator into physical contact with the absorbent layer of the pad body includes attaching the odor applicator to the absorbent layer of the pad body using the adhesive layer such that the first surface of the odor applicator shares an interface with the upper surface of the pad body and the second surface of the odor applicator faces upward.

According to an embodiment of any paragraph(s) of this summary, the target substance includes a substance produced by a pet; and the substance source external to the pad body includes a second pad body on which the substance produced by the pet has been deposited.

The above summary is not intended to describe each illustrated embodiment or every implementation of the present disclosure.

BRIEF DESCRIPTION OF THE DRAWINGS

The accompanying drawings, which are incorporated in and constitute a part of the specification, illustrate various example systems, methods, and so on, that illustrate various example embodiments of aspects of the invention. It will be appreciated that the illustrated element boundaries (e.g., boxes, groups of boxes, or other shapes) in the figures represent one example of the boundaries. One of ordinary skill in the art will appreciate that one element may be designed as multiple elements or that multiple elements may be designed as one element. An element shown as an internal component of another element may be implemented as an external component and vice versa. Furthermore, elements may not be drawn to scale.

DETAILED DESCRIPTION

Figure 1:
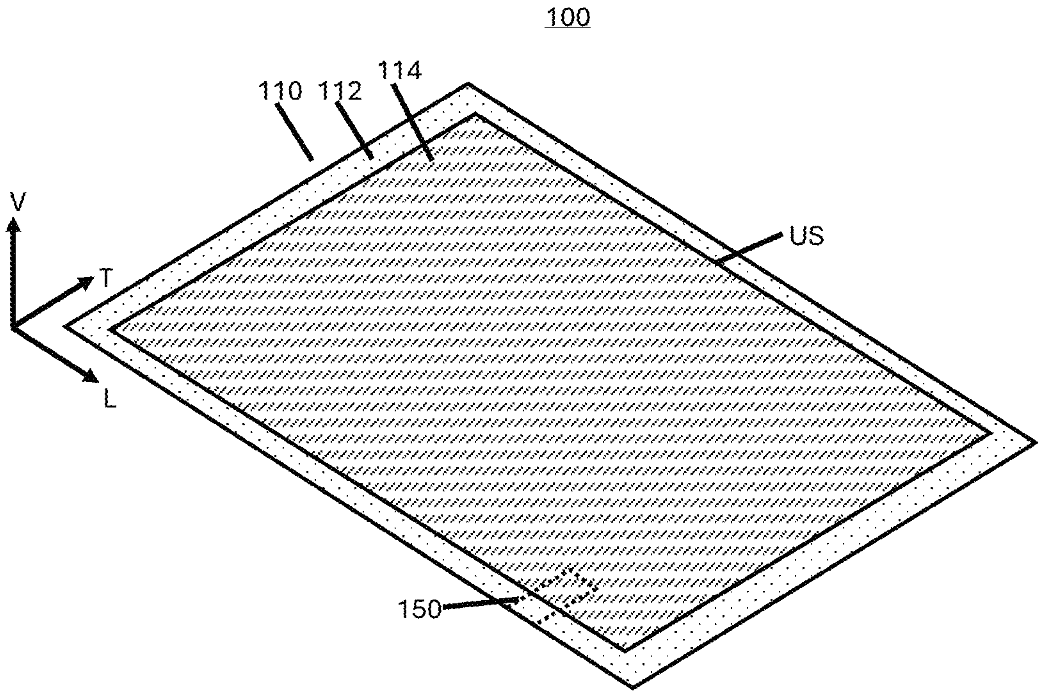
FIG. 1 illustrates a perspective view of a pet training pad device in an initial state when viewed obliquely from above, according to the embodiments of the present disclosure.

Hereinafter, embodiments of the present disclosure will be described with reference to the accompanying drawings. It should be understood that no limitation of the scope of the disclosure is thereby intended. Any alterations and further modifications of the inventive features illustrated herein, and any additional applications of the principles of the disclosure as illustrated herein, which would normally occur to one skilled in the relevant art and having possession of this disclosure, are to be considered within the scope of the disclosure. Additionally, it should be noted in the following description that the same reference numerals in different embodiments denote the same or similar features.

As described herein, pet owners often face significant challenges when training pets to consistently use waste collection pads. One of the primary difficulties is encouraging the pet to associate the pad with a designated elimination area, especially in cases where pets are accustomed to outdoor environments or have not been previously trained to use such pads. Conventionally, some waste collection pads have been impregnated with various artificial or natural scents in an attempt to encourage pets to eliminate on the pad. These scents are typically designed to mimic pheromones or other odors that are thought to attract pets to the area. While these scented pads have some level of effectiveness, it has been observed that the most effective scent for incentivizing a pet to eliminate on a waste collection pad is the scent of the pet's own bodily substances, such as the pet's own urine. This natural scent acts as a powerful trigger for the pet's instinctive behavior to eliminate in familiar or marked areas. Accordingly, aspects of the present disclosure relate to a pet training pad device that not only retains the convenience of conventional pads but also facilitates the transfer and retention of the pet's own odor onto the pad. Such a pad may better leverage the pet's instinctive responses, aiding in behavioral conditioning and improving the success of house training by making the pad more appealing for repeated waste elimination.

Turning now to the figures, FIGS. 1-5C illustrate various views of a pet training pad device 100 according to the embodiments of the present disclosure. Herein, for convenience of description, elements present in multiple views will be collectively described with reference to the figures.

With regard to directions, herein, aspects of the disclosure will be described with reference to directions defined relative to the pet training pad device 100. As illustrated in FIG. 1-3, 5A, and 5C, a direction parallel to the longitudinal axis of the pet training pad device 100 is referred to as the longitudinal direction L, a direction parallel to a transverse axis of the pet training pad device 100 is referred to as the transverse direction T, and the height direction of the pet training pad device 100 (e.g., a direction perpendicular to the plane of the surface on which the pet training pad device 100 rests) is referred to as the vertical direction V.

Figure 2:
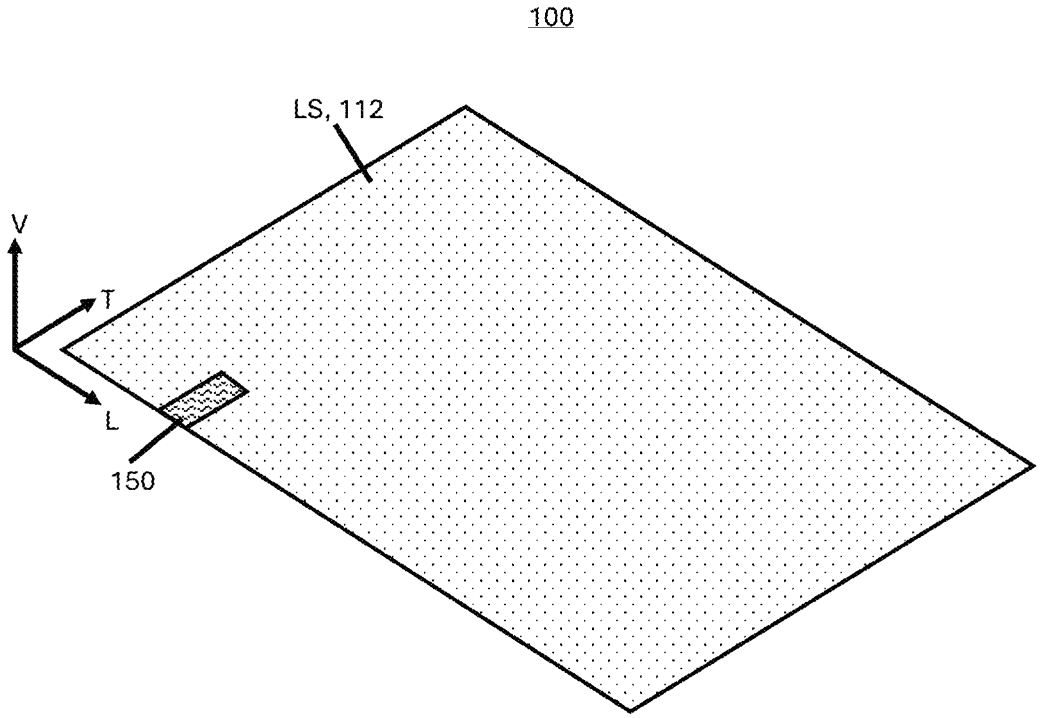
FIG. 2 illustrates a perspective view of the pet training pad device in an initial state when viewed obliquely from below, according to the embodiments of the present disclosure.

The overall structure of the pet training pad device 100 will be described with reference to FIGS. 1-2. FIG. 1 illustrates a perspective view of a pet training pad device 100 in an initial state when viewed obliquely from above. FIG. 2 illustrates a perspective view of the pet training pad device 100 in an initial state when viewed obliquely from below. As illustrated in FIGS. 1-2, the pet training pad device 100 primarily includes a pad body 110 and an odor applicator 150 (best seen in FIG. 2) removably attached to a lower surface of the pad body 110. Here, the initial state refers to a state of the training pad device 100 before the odor applicator 150 has been removed from the pad body 110 (e.g., a state of the training pad device 100 after manufacturing and before being deployed for use by a user).

In general, the pad body 110 refers to a mat, sheet, or pad for absorbing and containing pet waste. The pad body 110 may take any size and shape suitable for pet elimination training. For example, as illustrated in the Figures, in embodiments, the pad body 110 may be generally rectangular in shape, but the pad body 110 is not limited thereto, and may be circular, triangular, square, elliptical or any other suitable shape.

Similarly, the size of the pad body 110 is not particularly limited herein and may be provided in a variety of sizes suitable for use by a variety of types of animals. As examples, the pad body 110 may be provided in a size of 56×56 centimeters (22×22 inches) or 71×76 centimeters (28×30 inches). The pad body 110 may have a thickness of approximately 1 millimeter, although the present disclosure is not limited herein and the thickness may vary based on the content and structure of the individual layers constituting the pad body 110.

In embodiments, the pad body 110 may have a multi-layer structure. As an example, the pad body 110 may be formed from five layers, including a non-woven layer, a first tissue layer, a paper pulp and SAP layer, a second tissue layer, and a polyethylene film layer, respectively disposed from top to bottom.

More particularly, in embodiments, as illustrated in FIG. 1, the pad body 110 may include an at least an impermeable layer 112 and an absorbent layer 114. The impermeable layer 112 may include a material layer that is substantially impervious to fluids. As examples, the impermeable layer 112 may be formed from polyethylene, polypropylene, thermoplastic polyurethane, or other suitable fluid impervious material. The impermeable layer 112 may function to prevent liquid or semi-solid substances (e.g., excrement from a pet) from soaking through the pad body 110 and leaking onto the surface (e.g., floor) on which the pad body 110 is located. The absorbent layer 114 may include a material layer for absorbing and retaining fluids. As examples, the absorbent layer 114 may be formed from super absorbent polymers (SAP), fluff pulp (wood pulp), cellulose fiber, air-laid paper, polyester fiber, or any other suitable absorbent material. The absorbent layer 114 may function to capture and retain liquid or semi-solid substances (e.g., excrement from a pet). In embodiments, the absorbent layer 114 may be impregnated with a scent to attract pets. In certain embodiments, the absorbent layer 14 may include activated carbon, sodium bicarbonate, zeolite, antimicrobial agents, essential oils, plant extracts, cyclodextrins, citric acid, odor absorbing polymers, enzymes, or the like to neutralize odors. Additionally, while not shown in the Figures, the pad body 110 may optionally include a comfort layer provided above the absorbent layer 114. The comfort layer may be formed from a soft, flexible, quick-drying material such as a non-woven fabric (polyester or polypropylene) or cotton fibers. The comfort layer may function to facilitate quick drying of the surface of the pad body 110 after being used by a pet.

As used herein, the term "absorbent" may refer to the characteristic of a substance to retain moisture. Accordingly, in the present disclosure, absorbency may include absorbency by hydrophilic materials that trap liquid through molecular bonding (e.g., trapping water by coordinating it with polar hydrogen bonds) as well as hydrophobic materials (e.g., polyester) that capture liquid in entropic pockets (e.g., trapping water by holding it in entropic pockets within a non-polar/hydrophobic material).

In embodiments, the pad body 110 and the attached odor applicator 150 described herein may be disposable. That is, the pad body 110 and the attached odor applicator 150 may be configured to be discarded by the user after a limited number of uses. In such an embodiment, the pad body 110 and the attached odor applicator 150 may be constructed from lightweight, low-cost materials that can be easily folded and discarded in a standard waste receptacle. However, the present disclosure is not limited hereto, and the aspects of the present disclosure are equally applicable to a pet training pad device 100 constructed from washable materials and designed for multiple uses.

As illustrated in FIG. 1, the absorbent layer 114 may be provided above the impermeable layer 112 in the vertical direction V so as to overlay the impermeable layer 112. In embodiments, the size of the impermeable layer 112 may exceed the size of the absorbent layer 114 in one or more dimensions (e.g., in the longitudinal direction L and the transverse direction T). The absorbent layer 114 may be attached to the impermeable layer 112 via one or more layer bonding techniques such as adhesive bonding, heat sealing/stamping, ultrasonic bonding, or the like. Additionally, the edges of the absorbent layer 114 and the impermeable layer 112 may be sealed together using adhesives (e.g., glue), heat sealing/stamping, ultrasonic sealing, or the like to prevent leakage from the edges of the pad body 110.

It will be understood that here, the absorbent layer 114 and the portion of the impermeable layer 112 extending beyond the perimeter of the absorbent layer 114 constitute an upper surface US of the pad body 110. It will further be understood that the pet training pad device 100 is generally intended to be used in an orientation with the upper surface US facing upward in the vertical direction V, such that target substances (e.g., excrement) deposited on the pad body 110 may be substantially absorbed by the absorbent layer 114.

As illustrated in FIG. 2, the odor applicator 150 may be provided on a portion of the pad body 110. The odor applicator 150 may be a member including a segment, strip, band, ribbon, or other material structure removably attached to the pad body 110 for facilitating transfer of a target odor from a target substance to the pad body 110. In embodiments, the odor applicator 150 may have a generally rectangular shape, but the size and shape of the odor applicator 150 are not particularly limited herein. In embodiments, the odor applicator 150 may be removably attached to a lower surface LS of the pad body 110. It will be understood that here, the lower surface LS of the pad body 110 refers to the surface of the pad body 110 opposite the upper surface US (e.g., opposite the surface on which the absorbent layer 114 is provided). That is, the lower surface LS refers to the surface of the pad body 110 that faces downward in the vertical direction V and that is in contact with the ground or floor when the pet training pad device 100 is in use. In embodiments, the odor applicator 150 may preferably be attached along a peripheral edge of the lower surface LS of the pad body 110 to facilitate removal by a user, but the region of the pad body 110 to which the odor applicator 150 is attached is not particularly limited herein. For instance, in one embodiment, the odor applicator 150 may be attached to the upper surface US of the pad body 110, for example in the perimeter region of the impermeable layer 112 extending beyond the perimeter of the absorbent layer 114.

Next, the structure and operation of the odor applicator 150 will be described with reference to FIGS. 3-5C.

Figure 3:
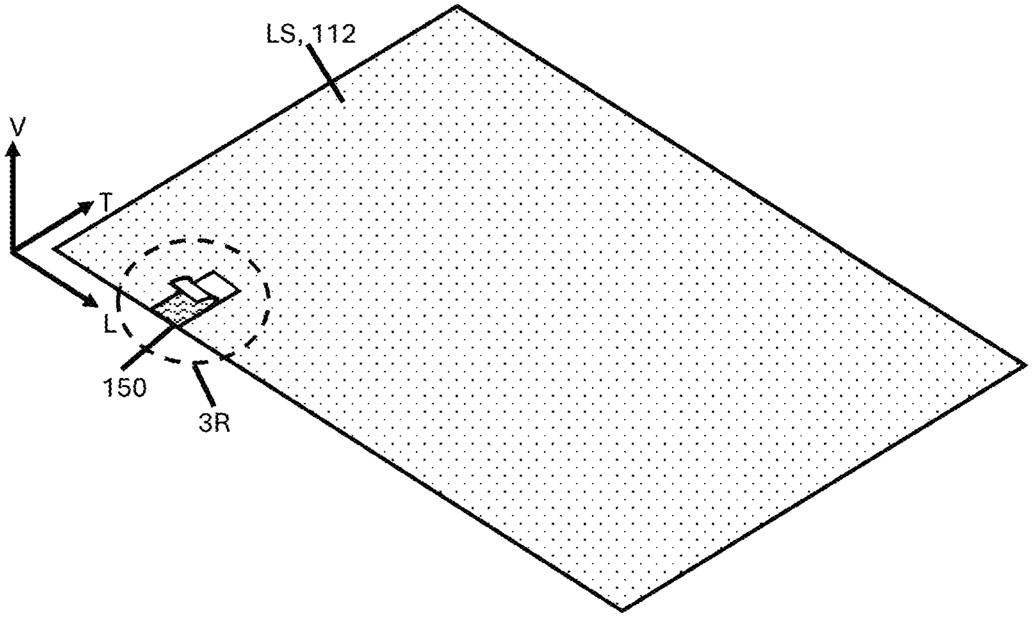
FIG. 3 illustrates an additional perspective view of the pet training pad device when viewed obliquely from below, according to the embodiments of the present disclosure.

FIG. 3 illustrates an additional perspective view of the pet training pad device 100 when viewed obliquely from below, according to the embodiments of the present disclosure. As described herein, in embodiments, the odor applicator 150 may be removably attached to the lower surface LS of the pad body 110. More particularly, in certain embodiments, as illustrated in region 3R of FIG. 3, the odor applicator 150 may be attached to the lower surface LS of the pad body 110 by means of an adhesive, such that the odor applicator 150 may be peeled off the lower surface LS of the pad body 110 by a user to be utilized to apply a target odor to the pad body 110. In the following, an example will be described with reference to the Figures of a configuration in which the odor applicator 150 may be removably attached to the lower surface LS of the pad body 110, but as described above, the location of the pad body 110 to which the odor applicator 150 is attached is not particularly limited herein.

Figure 4A:
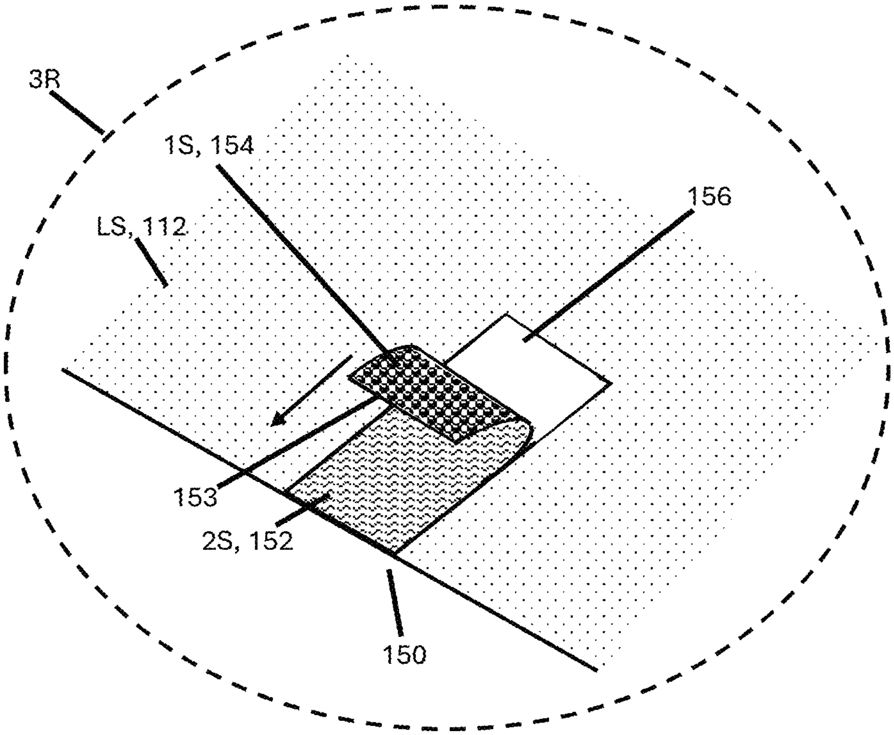
FIG. 4A illustrates an expanded view of the region 3R shown in FIG. 3 of the pet training pad device in a state in which an odor applicator is partially removed from a pad body, according to the embodiments of the present disclosure.

FIG. 4A illustrates an expanded view of the region 3R shown in FIG. 3 of the pet training pad device 100 in a state in which the odor applicator 150 is partially removed from the pad body 110, according to the embodiments of the present disclosure. In embodiments, the odor applicator 150 may include a first surface 1S provided with an attachment layer 154 and a second surface 2S opposite the first surface 1S provided with an odor transfer layer 152. It will be understood that, in the example illustrated in the Figures, as the attachment layer 154 is provided on the first surface 1S of the odor applicator 150 and the odor transfer layer 152 is provided on the second surface 2S of the odor applicator 150, the attachment layer 154 and the first surface 1S refer to substantially the same region of the odor applicator 150, and similarly, the odor transfer layer 152 and the second surface 2S refer to substantially the same region of the odor applicator 150.

Here, the attachment layer 154 refers to a material layer for facilitating secure yet removable attachment of the odor applicator 150 to the pad body 110. The attachment layer 154 may be configured to facilitate attachment of the odor applicator 150 to the pad body 110 using one or more attachment techniques including adhesives, hook and loop fasteners, polypropylene hooks, heat stamping, or other suitable attachment method. In embodiments, the attachment layer 154 may include an adhesive layer having a pressure-sensitive adhesive (PSA) that provides sufficient adhesive force to hold the odor applicator 150 to the pad body 110 while allowing for easy removal without damaging the pad body 110 or leaving behind adhesive residue. More particularly, the adhesive layer used as the attachment layer 154 may include acrylic-based adhesives, rubber-based adhesives, or silicone adhesives, or other suitable adhesive material. The use of such an adhesive may facilitate a balance between adhesive strength and removability, such that the odor applicator 150 remains securely fixed to the pad body 110 but can be peeled off cleanly when necessary. It should be noted that while a configuration of an odor applicator 150 having an adhesive layer is provided here as an example, the odor applicator 150 is not limited thereto, and may be provided with any suitable attachment technique to facilitate attachment to the pad body 110.

In an initial state, the attachment layer 154 of the odor applicator 150 may be removably attached to the pad body 110 such that the attachment layer 154 shares an interface with the lower surface LS of the pad body 110. Here, "sharing an interface" refers to a configuration in which two surfaces (e.g., the attachment layer 154 and the lower surface LS) come into direct physical contact with each other at a common boundary. In certain embodiments, in the case that the attachment layer 154 is provided with an adhesive, a release liner 156 may be provided on the lower surface LS of the pad body 110, and the attachment layer 154 may be provided on the release liner 156 to facilitate ease of removal of the odor applicator 150. Here, the release liner 156 refers to a paper or plastic-based film coated with a release agent such as a wax, fatty ester, silicon, or metallic soap to allow for the attachment layer 154 to be cleanly peeled off from the lower surface LS of the pad body 110 without leaving an adhesive residue. As shown in FIG. 4A, a user may grip the odor applicator 150 by one of its edges, such as longitudinal edge 153 (e.g., a first longitudinal edge), and pull in the direction of the arrow (e.g., in the transverse direction T toward the nearest peripheral edge of the pad body) to peel the attachment layer 154 from the release liner 156. Here, it will be understood that the longitudinal edges of the odor applicator 150 refer to the edges of the odor applicator 150 in the direction of the longitudinal axis of the odor applicator 150 itself (e.g., and not the longitudinal direction T of the pad body 110).

The odor transfer layer 152 refers to a material layer for transferring a target odor from a target substance to the pad body 110. Here, the target substance refers to any substance having an odor detectable by a pet. More particularly, the target substance includes a bodily substance produced by the pet. For example, the target substance may include urine, feces, or other substance (e.g., saliva, vomit) produced by the pet. It should be noted that here, the target substance is preferably a bodily substance produced particularly by the pet to be trained, and not merely a substance that mimics the general chemical characteristics of a substance produced by a pet. By using a target substance produced by the pet to be trained, it is possible to capture a target odor having olfactory characteristics unique to the bodily substances produced by the pet and increase the effectiveness of behavioral conditioning. Accordingly, it will be understood that the target odor refers to an odor characteristic to the target substance. For instance, in the case that the target substance is pet urine, the target odor may be a urine odor.

In embodiments, the odor transfer layer 152 may include an absorbent layer that is absorbent with respect to the target substance. As described herein, the odor transfer layer 152 may be used to collect the target substance on the odor transfer layer 152 to facilitate transfer of the target odor associated with the target substance to the pad body 110. The odor transfer layer 152 may be formed from a material having a porous structure and high odor-absorption and odor-retention capacity. As examples, the material of the odor transfer layer 152 may include non-woven material, tissue, activated carbon, paper pulp, SAP, paper, natural fibers, synthetic fibers, zeolite, fibrous cellulose or the like. In certain embodiments, the odor transfer layer 152 may be configured to allow controlled release of the absorbed target odor over time, to maintain effectiveness for the duration of use of the pad body 110.

In embodiments, the second surface 2S of the odor applicator 150 may be provided with a grip region (not illustrated in the Figures) that is not impinged upon by the odor transfer layer 152. The grip region may, for instance, be provided over a predetermined area extending from the longitudinal edge 153 of the odor applicator 150.

The grip region may be provided with an easily-grippable material that inhibits leakage of the target substance from the odor transfer layer 152 into the grip region. Here, the grip region being not impinged upon by the odor transfer layer 152 refers to a configuration in which the odor transfer layer 152 (and therefore any target substance collected therein) does not intrude or encroach into the grip region. By providing the grip region on the odor applicator 150, it may be possible to facilitate collection of the target substance on the odor transfer layer 152 and application of the target substance from the odor transfer layer 152 to the pad body 110 without the target substance coming into contact with the fingers or hand of the user, thereby facilitating hygiene and cleanliness.

In certain embodiments, the odor applicator 150 may include a wetness indicator configured to change colors upon coming into contact with the target substance. For instance, the odor applicator 150 may include a pH-sensitive material (e.g., a glue) that changes to a blue color (e.g., to facilitate recognition by a pet) upon coming into contact with the target substance. As an example, the wetness indicator may include an adhesive indicator that includes a combination of adhesives and pH-sensitive substances, such that when a target substance such as pet urine is absorbed into the odor applicator 150, it causes a pH change and triggers a color shift (e.g., from white to blue or yellow). The adhesive may be made from polymer elastomers, phenyl ethylene resins or the like. In embodiments, the wetness indicator may include an ink-based indicator that uses modified acrylic resins mixed with pigments and other components, such that when a target substance such as pet urine is absorbed into the odor applicator 150, the moisture of the target substance interacts with the ink and causes a color change. As another example, the wetness indicator may include bromophenol blue such that the odor applicator 150 changes blue when exposed to a higher pH (e.g., a target substance such as urine).

Inclusion of the wetness indicator may provide a visual indicator to a user of the odor applicator 150 that the target substance has been adequately collected on the odor applicator 150, and also facilitate recognition by a pet when attached to the pad body 110.

Figure 4B:
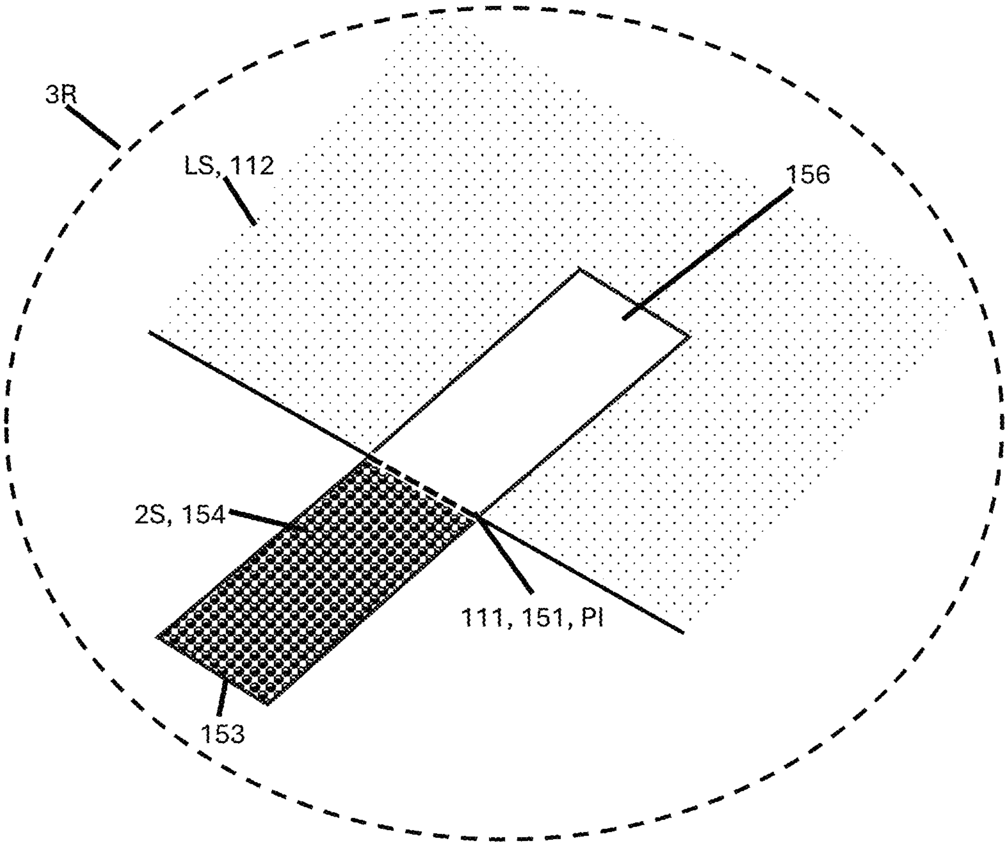
FIG. 4B illustrates an additional expanded view of the region 3R shown in FIG. 3 of the pet training pad device in a state in which the odor applicator is partially removed from the pad body, according to the embodiments of the present disclosure.

FIG. 4B illustrates an additional expanded view of the region 3R shown in FIG. 3 of the pet training pad device 100 in a state in which the odor applicator 150 is partially removed from the pad body 110, according to the embodiments of the present disclosure. In embodiments, in the initial state, longitudinal edge 151 (e.g., a second longitudinal edge) of the odor applicator 150 may be removably attached to peripheral edge 111 of the pad body 110. In certain embodiments, the longitudinal edge 151 of the odor applicator 150 may be removably attached to peripheral edge 111 of the pad body 110 along a separable interface. Here, the separable interface may include a tearable interface, a perforated interface, or the like. For convenience of explanation, herein, examples will be described of a case in which the separable interface includes a perforated interface PI. It will be understood that the longitudinal edge 151 of the odor applicator 150, the portion of the peripheral edge 111 of the pad body 110 to which the odor applicator 150 is attached, and the perforated interface PI refer to substantially the same region of FIG. 4B.

The perforated interface PI between the longitudinal edge 151 of the odor applicator 150 and the peripheral edge 111 of the pad body 110 may work in conjunction with the attachment layer 154 of the odor applicator 150 to allow for easy detachment of the odor applicator 150 from the pad body 110. The perforations of the perforated interface PI may be formed by a series of closely spaced cuts or holes, which provide a controlled point of weakness along the attachment line. This structure allows a user to tear or separate the odor applicator 150 from the pad body 110 without requiring additional tools, while ensuring that the odor applicator 150 remains securely fastened to the pad body 110 until intentional removal is desired.

Figure 4C:
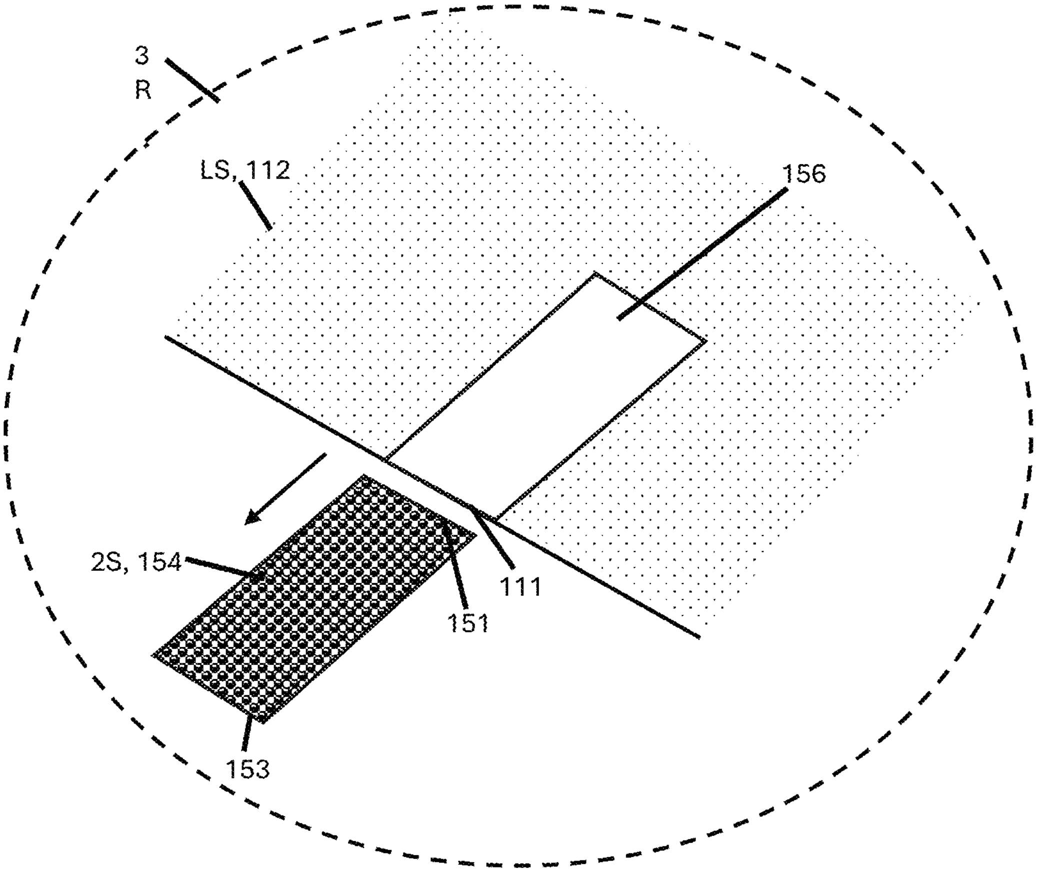
FIG. 4C illustrates an expanded view of the region 3R shown in FIG. 3 of the pet training pad device in a state in which the odor applicator has been removed from the pad body, according to the embodiments of the present disclosure.

FIG. 4C illustrates an expanded view of the region 3R shown in FIG. 3 of the pet training pad device 100 in a state in which the odor applicator 150 has been removed from the pad body 110, according to the embodiments of the present disclosure. As described herein, a user may grip the odor applicator 150 by one of its edges, such as longitudinal edge 153 (e.g., a first longitudinal edge), and pull in the direction of the arrow (e.g., in the transverse direction T toward the nearest peripheral edge of the pad body 110) to remove (e.g., peel) the attachment layer 154 from the release liner 156. Subsequently, the user may tear the longitudinal edge 151 of the odor applicator 150 from the peripheral edge 111 of the pad body 110 along the perforated interface PI (best seen in FIG. 4B) to separate the odor applicator 150 from the pad body 110. Once separated from the pad body 110, the odor applicator 150 may be used to collect a target substance (e.g., urine from a pet) to facilitate transfer of a target odor associated with the target substance to the pad body 110.

The operation of the odor applicator 150 for collecting a target substance 170 and applying a target odor of the target substance 170 to the pad body 110 will be described with reference to FIGS. 5A-5C.

Figure 5A:
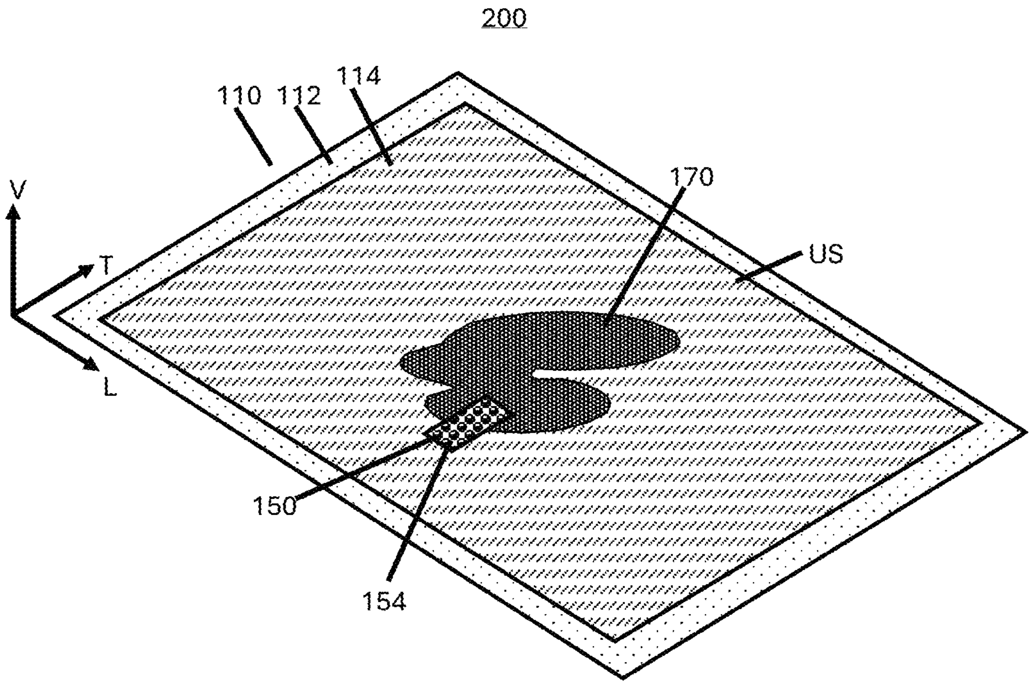
FIG. 5A illustrates an example of using the odor applicator to collect a target substance, according to the embodiments of the present disclosure.

FIG. 5A illustrates an example of using the odor applicator 150 to collect a target substance 170, according to the embodiments of the present disclosure. As described herein, the target substance 170 may include any substance having an odor detectable by a pet, and preferably includes urine, feces, or other substance (e.g., saliva, vomit) produced by the pet. It should be noted that for convenience of explanation, FIG. 5A illustrates an example in which the target substance 170 is collected from a pet training pad device 200. Here, the pet training pad device 200 may be another (e.g., a second) pet training pad device on which the target substance 170 has been deposited. That is, the pet training pad device 200 is a separate pet training pad device from the clean, unused pet training pad device 100 illustrated in FIGS. 1-3. It will be understood, however, that the substance source from which the target substance 170 is collected is not limited to the pet training pad device 200 and may be any location on which the target substance 170 has been deposited. For instance, in embodiments, the substance source may include a location external to the pet training pad device 100 such as a floor, ground, or wall on which the target substance 170 has been deposited. It should be noted that, as the pet training pad device 200 has the same structure as the pet training pad device 100 described herein, a redundant description thereof will be omitted, and the same reference numerals will be used with respect to the components of the pet training pad device 200.

After the odor applicator 150 has been separated from the pad body 110 of the pet training pad device 100, a user may use the odor applicator 150 to collect the target substance 170 on the odor transfer layer 152 (not illustrated in FIG. 5A). Here, collecting the target substance 170 on the odor transfer layer 152 of the odor applicator 150 may include dabbing, blotting, rubbing, immersing, patting, swabbing, or otherwise bringing the odor transfer layer 152 of the odor applicator 150 into physical contact with the target substance 170. For instance, in the case that the target substance 170 is pet urine deposited on a pet training pad device 200 (e.g., a soiled, second pet training pad device), after removing the odor applicator 150 from the pet training pad device 100 or the pet training pad device 200, the user may dip the odor transfer layer 152 of the odor applicator 150 into the pet urine on the pet training pad device 200 to collect the pet urine on the odor transfer layer 152 of the odor applicator 150.

Figure 5B:
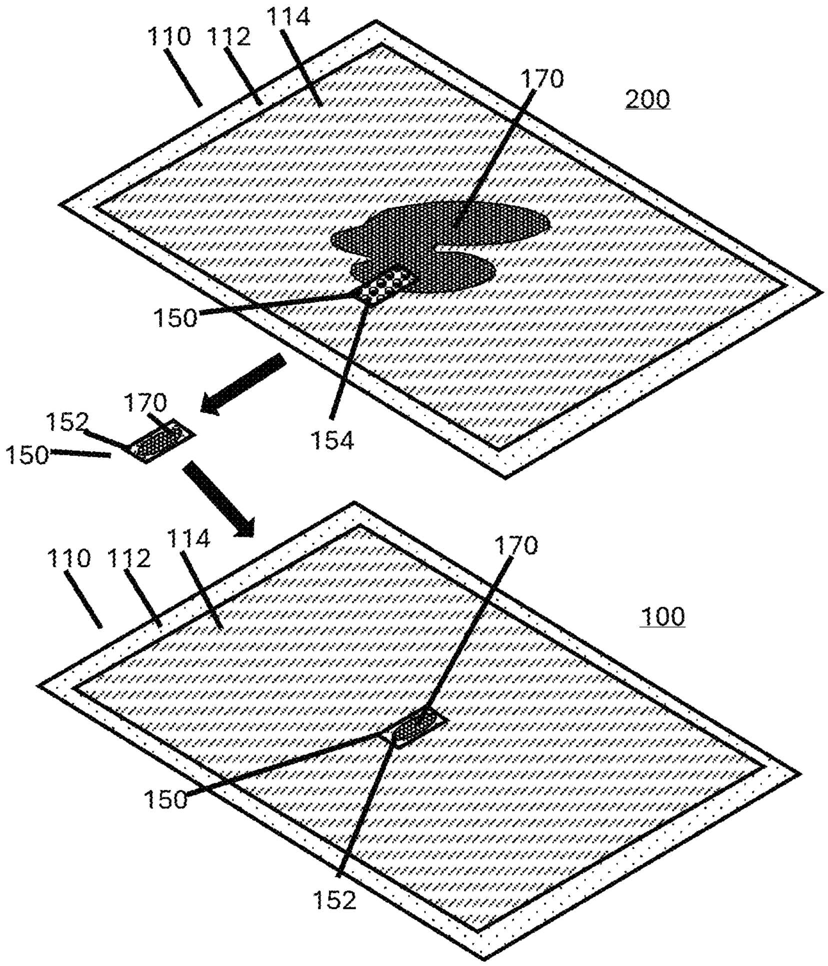
FIG. 5B illustrates an example of using the odor applicator to transfer a target odor from a target substance to the pad body of the pet training pad device, according to the embodiments of the present disclosure.

FIG. 5B illustrates an example of using the odor applicator 150 to transfer a target odor from a target substance 170 to the pad body 110 of the pet training pad device 100, according to the embodiments of the present disclosure. As illustrated in FIG. 5B, after the target substance 170 has been collected on the odor transfer layer 152 of the odor applicator 150 (e.g., from a substance source such as the second pet training pad device 200 on which the target substance 170 has been deposited), the user may bring the odor applicator 150 into physical contact with the absorbent layer 114 of the pet training pad device 100 to apply the target odor from the target substance 170 to the absorbent layer 114 of the pet training pad device 100. Here, applying the target odor from the target substance 170 on the odor transfer layer 152 of the odor applicator 150 to the absorbent layer 114 of the pet training pad device 100 may include touching, rubbing, or otherwise bringing the odor applicator 150 on which the target substance 170 has been collected into physical contact with the absorbent layer 114 of the pet training pad device 100 to impart the target odor of the target substance 170 to the absorbent layer 114 of the pet training pad device 100. In embodiments, the odor applicator 150 on which the target substance 170 has been collected may be attached to a region of the absorbent layer 114 of the pet training pad device 100.

Figure 5C:
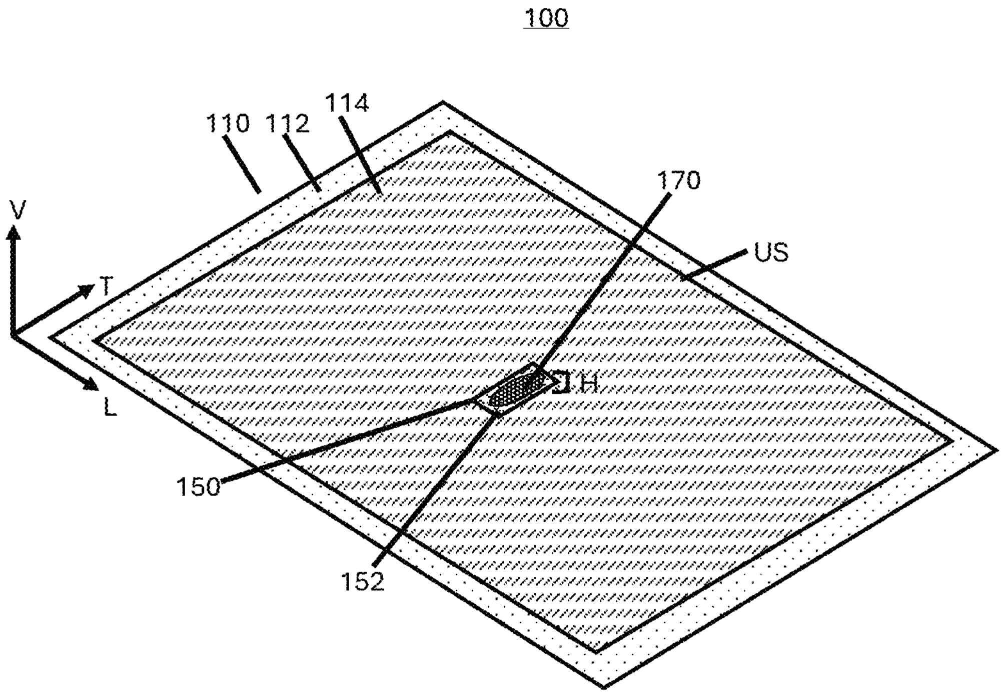
FIG. 5C illustrates an example of the pet training pad device in a state in which the odor applicator on which the target substance has been collected is attached to the pad body, according to the embodiments of the present disclosure.

FIG. 5C illustrates an example of the pet training pad device 100 in a state in which the odor applicator 150 on which the target substance 170 has been collected is attached to the pad body 110, according to the embodiments of the present disclosure. As illustrated in FIG. 5C, in embodiments, after the target substance 170 has been collected on the odor transfer layer 152 of the odor applicator 150, the user may orient the odor applicator 150 such that the attachment layer 154 (not illustrated in FIG. 5C) faces downward in the vertical direction V and the odor transfer layer 152 on which the target substance 170 has been collected faces upward in the vertical direction V. Subsequently, the user may place the odor applicator 150 on a region of the upper surface US of the pad body 110 and apply pressure to cause the attachment layer 154 to affix to the upper surface US of the pad body 110. In this way, the odor applicator 150 can be reattached to the upper surface US of the pad body 110 using the attachment layer 154 such that the first surface 1S (best seen in FIG. 4) shares an interface with the upper surface US of the pad body 110 and the second surface 2S (best seen in FIG. 4) of the odor applicator 150 faces upward in the vertical direction V.

By attaching (e.g., reattaching) the odor applicator 150 on which the target substance 170 has been collected to the upper surface US of the pad body 110, it is possible to effectively transfer the target odor of the target substance 170 to the pad body 110. As described herein, by transferring a target odor such as a urine odor from urine produced by the pet to the upper surface US of the pad body 110, the pheromones included in the urine odor may be effective to incentivize the pet to eliminate on the pad body 110 in the region on which the odor applicator 150 has been attached. In embodiments, aspects of the present disclosure relate to the recognition that it may be preferable to attach (e.g., reattach) the odor applicator 150 to a central region of the absorbent layer 114 on the upper surface US of the pad body 110 to encourage the pet to eliminate in the central region of the pet training pad device 100, reducing the risk of accidents and need for cleanup. Here, the central region of the pet training pad device 100 refers to a region of the pet training pad within a predetermined radius (e.g., 2 centimeters, 4 centimeters, 6 centimeters) from a central coordinate of the pet training pad device 100. Additionally, it should be noted that the odor applicator 150 on which the target substance has been collected may be reused with respect to multiple new pad bodies 110. Alternatively, a user may discard the odor applicator 150 after use and utilize the fresh odor applicator 150 removably attached to each new pad body 110 to collect the target substance.

In embodiments, aspects of the present disclosure relate to the recognition that some domesticated animal breeds (e.g., dogs) have substantially dichromatic vision, such that they perceive their surroundings in hues of two colors. Accordingly, aspects of the disclosure relate to providing all or a portion of the odor applicator 150 in a color that may be easily discerned by dichromatic animals such as dogs. For instance, as blue and yellow have been identified as colors that may be easily discerned by some dichromatic animals, in embodiments, the odor applicator 150 may be provided in a generally blue or yellow color. More particularly, in certain embodiments, the odor applicator 150 may have a brightness value (L*) ranging from 0 to 100, a green-red component (a*) value of 0, and a blue-yellow component (b*) value ranging from −128 to 0 in an L*a*b color system to provide the odor applicator 150 with a generally blue color. In certain embodiments, the odor applicator 150 may have a brightness value (L*) ranging from 0 to 100, a green-red component (a*) value of 0, and a blue-yellow component (b*) value ranging from 0 to 128 in an L*a*b color system to provide the odor applicator 150 with a generally yellow color. In this way, it may be possible to facilitate visual identification of the target structure 150 by dichromatic animals to further encourage elimination near the target structure 150.

In certain embodiments, the odor applicator 150 may have a high-contrast color pattern, such as black and white or blue and white. In certain embodiments, the odor applicator 150 and the pad body 110 may be provided in contrasting colors (e.g., black or blue pad body 110 and yellow or white odor applicator 150). In certain embodiments, the odor applicator 150 may be provided using a reflective or shiny material to enhance visual interest in the odor applicator 150 by the pet. In this way, it may be possible to facilitate visual identification of the odor applicator 150 by dichromatic animals to further encourage elimination near the odor applicator 150.

In embodiments, when attached to the upper surface US of the pad body 110, the odor applicator 150 may have a height H in the vertical direction V that achieves a predetermined height threshold range. That is, the odor applicator 150 may protrude above the upper surface US by a predetermined distance equal to the height H. In embodiments, the predetermined height threshold range may be set by the manufacturer to a value based on the type of pet envisioned to use the pet training pad device 100. For instance, the predetermined height threshold range may be set to a higher value in cases in which the pet training pad device 100 will be used by larger breeds of dogs, and the predetermined height threshold range may be set to a lower value in cases in which the pet training pad device 100 will be used by smaller breeds of dogs. As an example, in embodiments, the predetermined height threshold range may be set to a value between 0.15 millimeters and 5 centimeters (0.006 inches to 1.96 inches). In embodiments, the desired height H of the odor applicator 150 may be achieved by increasing the thickness of an absorbent material provided on the odor transfer layer 152 of the odor applicator 150. In certain embodiments, the odor applicator 150 may include an additional padding layer between the first surface 1S and the second surface 2S to provide the odor applicator 150 with additional thickness and therefore additional height when attached to the upper surface US of the pad body 110. Providing the odor applicator 150 with a height in the vertical direction V that achieves a predetermined height threshold range may increase the visibility of the odor applicator 150 and further encourage pets to perform elimination on the pad body 110 in the vicinity of the odor applicator 150, while maintaining a height low enough that pets may easily walk over the odor applicator 150.

In embodiments, the second surface 2S of the odor applicator 150 may be provided with a textured surface having a texture different than the upper surface US of the pad body 110. For example, the second surface 2S of the odor applicator 150 may be provided with bumps, ridges, soft padding, or the like. By providing the second surface 2S of the odor applicator 150 with a texture different than the texture of the upper surface US of the pad body 110, it is possible to facilitate a pet's recognition of the odor applicator 150 as a preferable location to eliminate.

Next, with reference to FIGS. 6-13, a series of examples of the odor applicator 150 will be described. It will be understood that the examples of the odor applicator 150*a-f* described below are provided for illustrative purposes only, and the odor applicator 150 according to the present disclosure is not limited to any particular example. Additionally, for convenience of explanation, an explanation of redundant aspects of the odor applicator 150 will be omitted herein, but it will be understood that the various components and features of the examples provided below may be suitably combined with the features of any of the other embodiments or examples provided herein. Further, it will be understood that the dimensions provided for each example are merely provided for reference and may be adjusted to any suitable size.

Figure 6A:
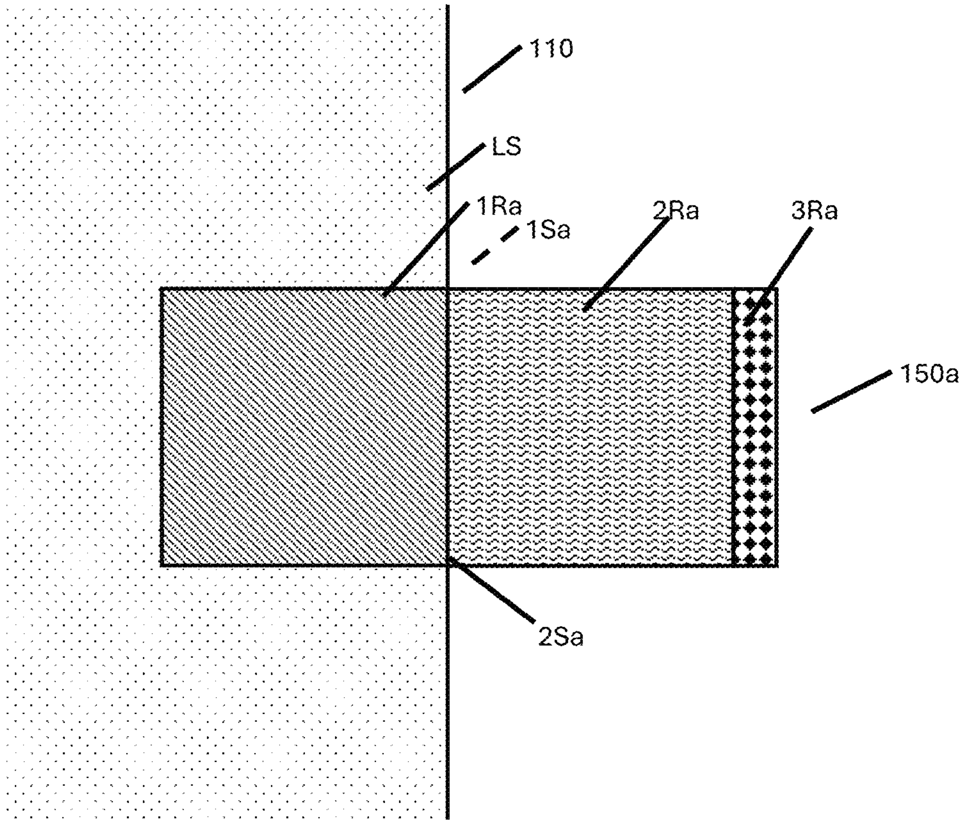
FIG. 6A illustrates a first example of an odor applicator according to the embodiments of the present disclosure.

FIG. 6A illustrates a first example of an odor applicator 150*a* according to the embodiments of the present disclosure. The odor applicator 150*a* may include a first surface 1Sa (not visible in FIG. 6A) attached to the lower surface LS of the pad body 110 and a second surface 2Sa (visible in FIG. 6A). The odor applicator 150*a* may include a first region 1Ra, a second region 2Ra, and a third region 3Ra. The first region 1Ra may be formed of biaxially-oriented polypropylene (BOPP). The second region 2Ra and the third region 3Ra may be formed of polypropylene. In the first region 1Ra, the first surface 1Sa may be bonded to the lower surface LS of the pad body 110 using a permanent adhesive. The second region 2Ra and the third region 3Ra may extend beyond the perimeter of the pad body 110. In embodiments, in the second region 2Ra and the third region 3Ra, the first surface 1Sa or the second surface 2Sa may be coated with a repositionable adhesive for removable attachment to the upper surface US (not illustrated in FIG. 6A) of the pad body 110. The repositionable adhesive may be covered with a release liner in an initial state that may be peeled off by a user to facilitate attachment to the pad body 110. In embodiments, in the second region 2Ra and the third region 3Ra, the first surface 1Sa or the second surface 2Sa may be provided with hook and loop fasteners such as polypropylene hooks for removable attachment to the upper surface US (not illustrated in FIG. 6A) of the pad body 110. In the second region 2Ra, the first surface 2Sa or the second surface 2Sa may be provided with an odor transfer layer 152*a*. In the third region 3Ra, the first surface 2Sa or the second surface 2Sa may be provided with a visual indicator having a color easily discernible by dichromatic animals.

The odor applicator 150*a* may have a length in the longitudinal direction of 75 mm, a length in the lateral direction of 30 mm, and a thickness of 0.15 mm. More particularly, the first region 1Ra may have a length in the longitudinal direction of 40 mm, the second region 2Ra may have a length in the longitudinal direction of 23 mm, and the third region 3Ra may have a length in the longitudinal direction of 12 mm. Here, it will be understood that the longitudinal direction and the lateral direction refer to the directions parallel to the longitudinal axis and the lateral axis, respectively, of the odor applicator 150*a*.

Figure 6B:
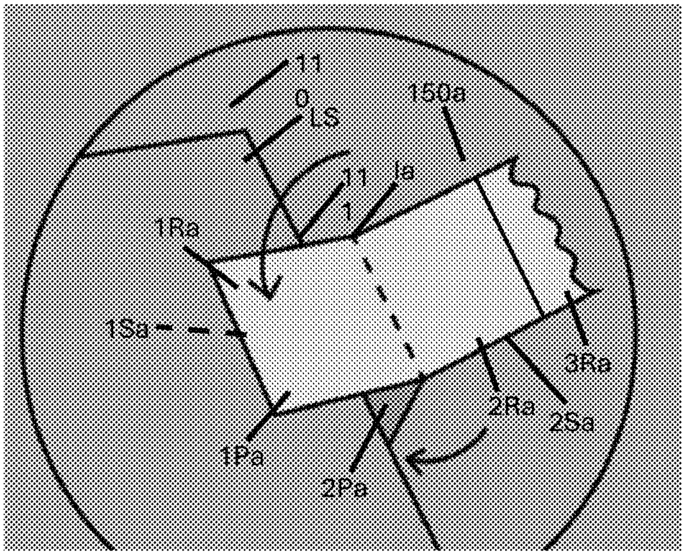
FIG. 6B illustrates an example of removing an odor applicator from a pad body, according to the embodiments of the present disclosure.

FIG. 6B illustrates an example of removing the odor applicator 150*a* from the pad body 110, according to the embodiments of the present disclosure. As described herein, in embodiments, in the first region 1Ra, the first surface 1Sa of the odor applicator 150*a* may be bonded to the lower surface LS of the pad body 110 using a permanent adhesive. More particularly, permanent adhesive may be provided on both the lower side LS and the upper side US (not visible in FIG. 6B) of the pad body 110 in the vicinity of the peripheral edge 11, and the first region 1Ra of the odor applicator 150*a* may be provided with a first portion 1Pa and a second portion 2Pa that interpose the pad body 110 so as to engage with the permanent adhesive on both the lower side LS and the upper side US of the pad body 110. That is, the first portion 1Pa of the first region 1Ra of the odor applicator 150*a* may bond with the permanent adhesive on the lower surface LS of the pad body 110, and the second portion 2Pa of the first region 1Ra of the odor applicator 150*a* may bond with the permanent adhesive on the upper surface US of the pad body 110. Such a configuration may provide additional structural integrity for the odor applicator 150*a*.

The second region 2Ra and the third region 3Ra of the odor applicator 150*a* may be removed from the first region 1Ra along the interface la such that the first region 1Ra remains attached to the pad body 110. In embodiments, the interface la may be provided with perforation to facilitate ease of removal. Once removed from the pad body 110, the second region 2Ra and the third region 3Ra of the odor applicator 150*a* may be attached to the upper surface US of the pad body 110 using the provided adhesive layer, hook and loop fasteners, or the like to incentivize pets to eliminate on the upper surface US of the pad body 110.

Figure 7:
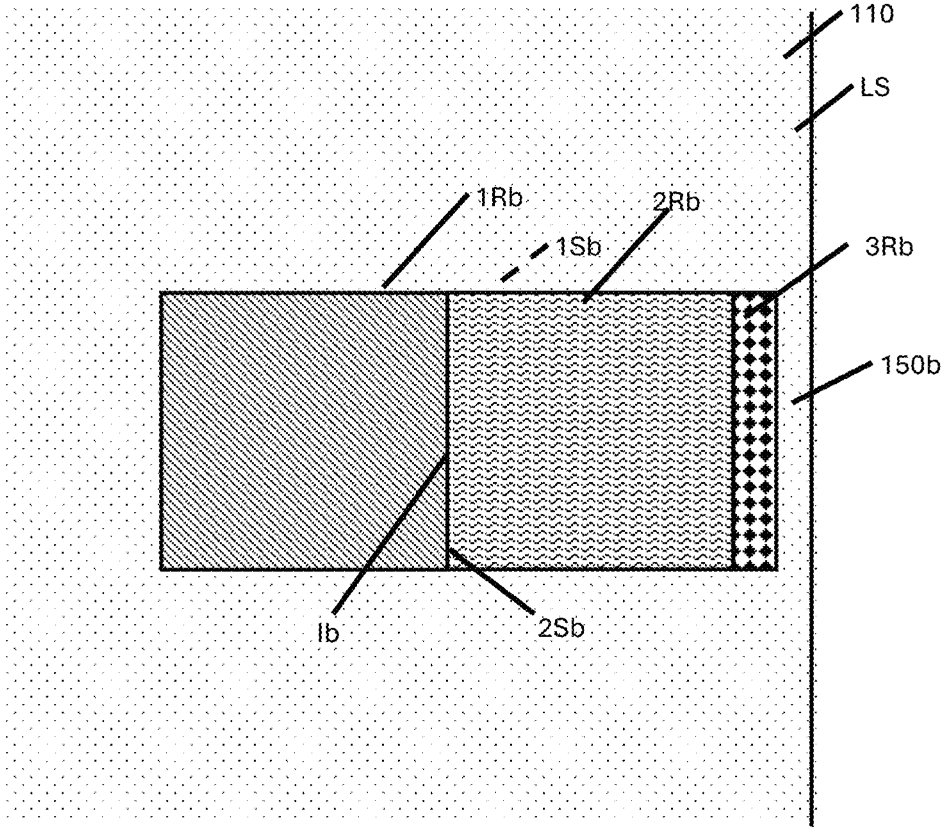
FIG. 7 illustrates a second example of an odor applicator according to the embodiments of the present disclosure.

FIG. 7 illustrates a second example of an odor applicator 150*b* according to the embodiments of the present disclosure. The odor applicator 150*b* may include a first surface 1Sb (not visible in FIG. 7) attached to the lower surface LS of the pad body 110 and a second surface 2Sb (visible in FIG. 7). The odor applicator 150*b* may include a first region 1Rb, a second region 2Rb, and a third region 3Rb. The first region 1Rb may be formed of biaxially-oriented polypropylene (BOPP). The second region 2Rb and the third region 3Rb may be formed of polypropylene. In the first region 1Rb, the first surface 1Sb may be bonded to the lower surface LS of the pad body 110 using a permanent adhesive. The second region 2Rb and the third region 3Rb may remain detached from (e.g., not bonded with) the lower surface LS of the pad body 110. In embodiments, the second region 2Rb and the third region 3Rb may be provided as separate members detached from the first region 1Rb. As illustrated in FIG. 7, the first region 1Rb, the second region 2Rb, and the third region 3Rb may be located within the perimeter of the pad body 110.

In embodiments, in the second region 2Rb and the third region 3Rb, the first surface 1Sb or the second surface 2Sb may be coated with a repositionable adhesive for removable attachment to the upper surface US (not illustrated in FIG. 7) of the pad body 110. The repositionable adhesive may be covered with a release liner in an initial state that may be peeled off by a user to facilitate attachment to the pad body 110. In embodiments, in the second region 2Rb, the first surface 1Sb or the second surface 2Sb may be provided with hook and loop fasteners such as polypropylene hooks for removable attachment to the upper surface US (not illustrated in FIG. 7) of the pad body 110. In the second region 2Rb, the first surface 1Sb or the second surface 2Sb may be provided with an odor transfer layer 152*b*. In the third region 3Rb, the first surface 1Sb, the second surface 2Sb, or both the first surface 1Sb and the second surface 2Sb may be provided with a visual indicator having a color easily discernible by dichromatic animals.

The second region 2Rb and the third region 3Rb of the odor applicator 150*b* may be removed from the first region 1Rb along the interface Ib. In embodiments, the interface Ib may be provided with perforation to facilitate ease of removal. Once removed from the pad body 110, the second region 2Rb and the third region 3Rb of the odor applicator 150*b* may be attached to the upper surface US of the pad body 110 using the provided adhesive layer, hook and loop fasteners, or the like to incentivize pets to eliminate on the upper surface US of the pad body 110.

The odor applicator 150*b* may have a length in the longitudinal direction of 115 mm, a length in the lateral direction of 25 mm, and a thickness of 0.15 mm. More particularly, the first region 1Rb may have a length in the longitudinal direction of 61 mm, the second region 2Rb may have a length in the longitudinal direction of 46 mm, and the third region 3Rb may have a length in the longitudinal direction of 8 mm. Here, it will be understood that the longitudinal direction and the lateral direction refer to the directions parallel to the longitudinal axis and the lateral axis, respectively, of the odor applicator 150*b*.

Figure 8:
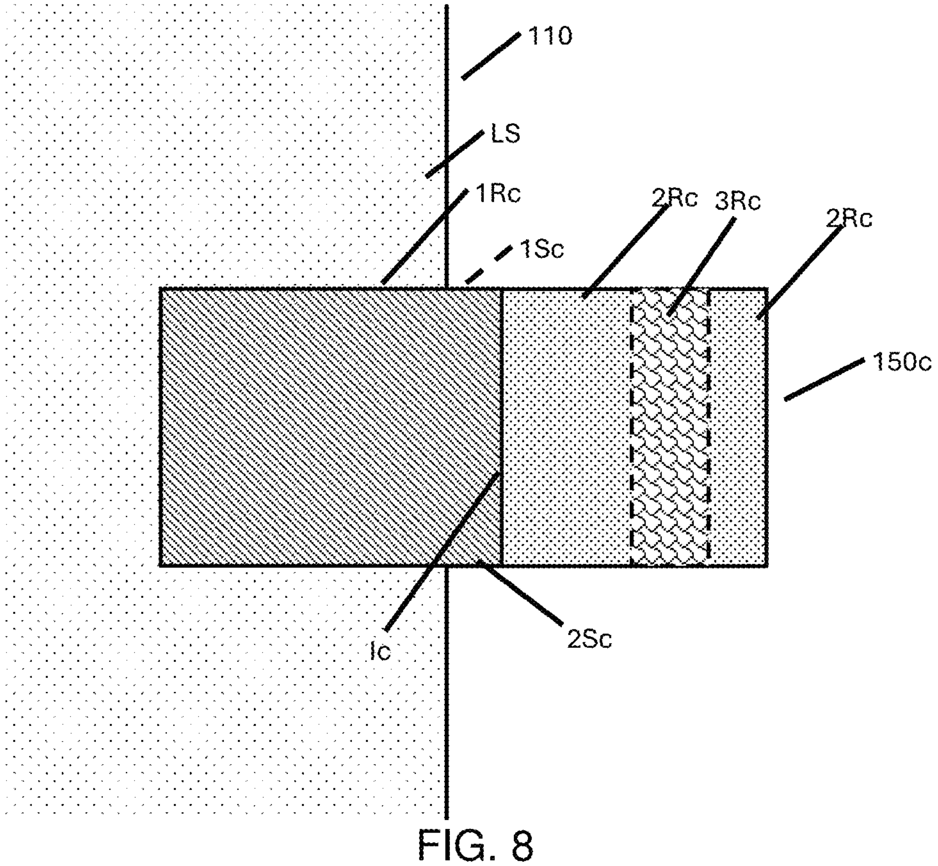
FIG. 8 illustrates a third example of an odor applicator according to the embodiments of the present disclosure.

FIG. 8 illustrates a third example of an odor applicator 150*c* according to the embodiments of the present disclosure. The odor applicator 150*c* may include a first surface 1Sc (not visible in FIG. 8) attached to the lower surface LS of the pad body 110 and a second surface 2Sc (visible in FIG. 8). The odor applicator 150*c* may include a first region 1Rc, a second region 2Rc, and a third region 3Rc. The first region 1Rc may be formed of biaxially-oriented polypropylene (BOPP). The second region 2Rc and the third region 3Rc may be formed of polypropylene. In the first region 1Rc, the first surface 1Sc may be bonded to the lower surface LS of the pad body 110 using a permanent adhesive. A portion of the first region 1Rc, the second region 2Rc and the third region 3Rc may extend beyond the perimeter of the pad body 110. In embodiments, in the second region 2Rc, the first surface 1Sc or the second surface 2Sc may be provided with a laminated non-woven material. The laminated non-woven material may function as an odor transfer layer 152*c*. In embodiments, in the third region 3Rc, the first surface 1Sc or the second surface 2Sc may be provided with hook and loop fasteners such as polypropylene hooks for removable attachment to the upper surface US (not illustrated in FIG. 8) of the pad body 110. In embodiments, the odor applicator 150*c* may have a structure similar to that shown in FIG. 6B with reference to the odor applicator 150*a* to facilitate removal from the pad body 110.

The second region 2Rc and the third region 3Rc of the odor applicator 150*c* may be removed from the first region 1Rc along the interface Ic. In embodiments, the interface Ic may be provided with perforation to facilitate ease of removal. Once removed from the pad body 110, the second region 2Rc and the third region 3Rc of the odor applicator 150*c* may be attached to the upper surface US of the pad body 110 using the provided adhesive layer, hook and loop fasteners, or the like to incentivize pets to eliminate on the upper surface US of the pad body 110.

The odor applicator 150*c* may have a length in the longitudinal direction of 60 mm, a length in the lateral direction of 30 mm, and a thickness of 0.15 mm. More particularly, the first region 1Rc may have a length in the longitudinal direction of 25 mm, the second region 2Rc may have a length in the longitudinal direction of 35 mm, and the third region 3Rb may have a length in the longitudinal direction of 12 mm. Here, it will be understood that the longitudinal direction and the lateral direction refer to the directions parallel to the longitudinal axis and the lateral axis, respectively, of the odor applicator 150*c*.

Figure 9A:
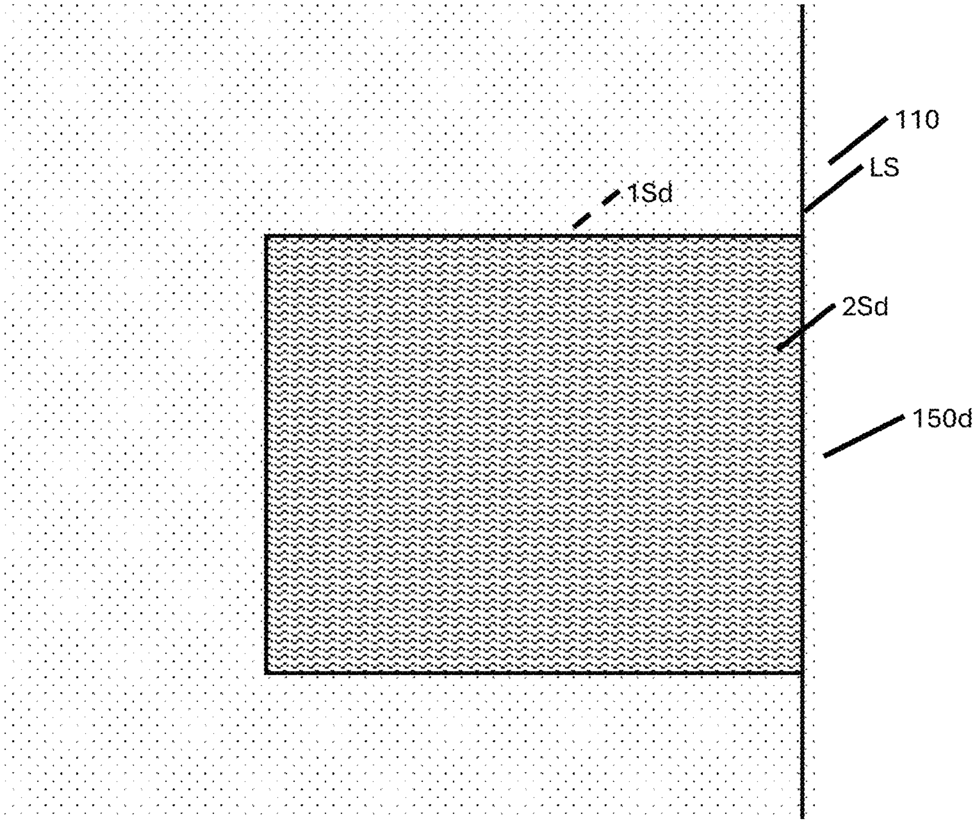
FIG. 9A illustrates a fourth example of an odor applicator according to the embodiments of the present disclosure.

FIG. 9A illustrates a fourth example of an odor applicator 150*d* according to the embodiments of the present disclosure. The odor applicator 150*d* may include a first surface 1Sd (not visible in FIG. 9A) attached to the lower surface LS of the pad body 110 and a second surface 2Sd (visible in FIG. 9A). The odor applicator 150*d* may be formed of a paper material. In embodiments, the first surface 1Sd of the odor applicator 150*d* may be provided with an adhesive layer of repositionable glue (that is, the glue remains with the odor applicator 150*d* after removal). The paper forming the second surface 2Sd of the odor applicator 150*d* may function as an odor transfer layer 152*d*.

In certain embodiments, the lower surface LS of the pad body 110 may be provided with permanent glue, and the first surface 1Sd of the odor applicator 150*d* that engages with the permanent glue on the lower surface LS of the pad body 110 may be provided with a release liner (e.g., silicon release paper) having a coating configured to allow peelable separation from the permanent glue. Accordingly, when the odor applicator 150*d* is peeled off the pad body 110, the permanent glue remains on the pad body 110 and not the first surface 1Sd of the odor applicator 150*d*. In this case, a portion of the second surface 2Sd of the odor applicator 150*d* may be provided with hook and loop fasteners such as polypropylene hooks or an additional removable adhesive layer covered by an additional release liner to facilitate removable attachment to the pad body 110. Further, another portion of the second surface 2Sd of the odor applicator 150*d* may serve as the odor transfer layer 152*d*. In certain embodiments, the release liner may be configured to remain adhered to the permanent glue on the pad.

Figure 9B:
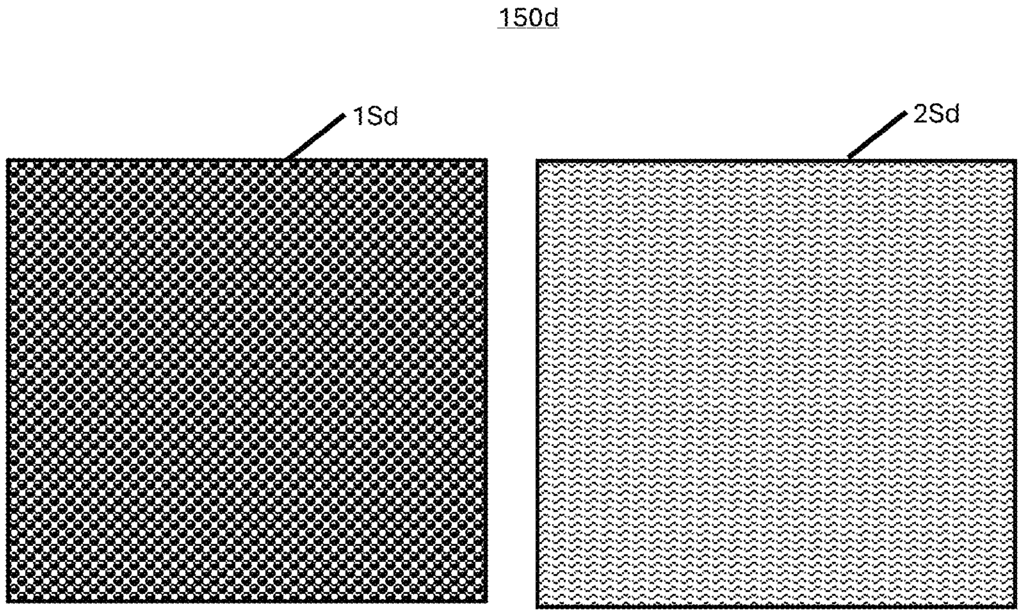
FIG. 9B illustrates first and second surfaces of an odor applicator according to the embodiments of the present disclosure.

FIG. 9B illustrates first and second surfaces 1Sd, 2Sd of the odor applicator 150*d* according to the embodiments of the present disclosure. As described herein, in embodiments, the first surface 1Sd of the odor applicator 150*d* may be provided with a removable adhesive layer and the second surface 2Sd of the odor applicator 150*d* may be provided with an odor transfer layer 152*d*. In certain embodiments, the removable adhesive layer on the first surface 1Sd of the odor applicator 150*d* may be covered by a release liner (e.g., silicon release paper, not illustrated in FIG. 9B) having a coating configured to allow peelable separation from the permanent glue. This release liner may be attached to permanent glue provided on the lower surface of the pad body 110. Accordingly, a user may peel the odor applicator 150*d* from the pad body 110 along the release liner provided on the first surface 1Sd, use the odor transfer layer 152 on the second surface 2Sd to collect a target substance, peel the release liner off the removable adhesive layer, and subsequently adhere the first surface 1Sd to a region of the pad body to attract a pet using the target odor from the target substance. The odor applicator 150*d* may have a length in the longitudinal direction of 72 mm, a length in the lateral direction of 42 mm, and a thickness of 1.6 mm. Here, it will be understood that the longitudinal direction and the lateral direction refer to the directions parallel to the longitudinal axis and the lateral axis, respectively, of the odor applicator 150*d*.

Figure 10:
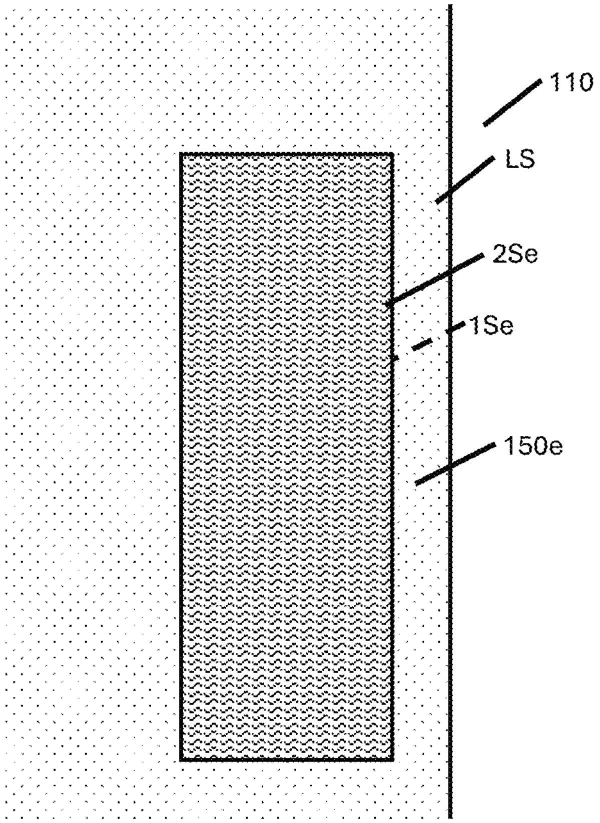
FIG. 10 illustrates a fifth example of an odor applicator according to the embodiments of the present disclosure.

FIG. 10 illustrates a fifth example of an odor applicator 150*e* according to the embodiments of the present disclosure. The odor applicator 150*e* may include a first surface 1Se (not visible in FIG. 10) attached to the lower surface LS of the pad body 110 and a second surface 2Se (visible in FIG. 10). The odor applicator 150*e* may be formed of polypropylene. In embodiments, the odor applicator 150*e* may be provided such that its longitudinal axis is parallel to the longitudinal axis of the pad body 110. The first surface 1Se of the odor applicator 150*e* may be adhered to the lower surface LS of the pad body 110 using permanent glue. A release liner may be provided between the first surface 1Se of the odor applicator 150*e* and the permanent glue to facilitate peelable removal of the odor applicator 150*e* from the pad body 110. A portion of the second surface 2Se of the odor applicator 150*e* may be provided with hook and loop fasteners such as polypropylene hooks to facilitate attachment to the pad body 110. Another portion of the second surface 2Se may serve as an odor transfer layer 152*e* for collecting a target substance. The odor applicator 150*e* may have a length in the longitudinal direction of 105 mm, a length in the lateral direction of 32 mm, and a thickness of 0.5 mm. Here, it will be understood that the longitudinal direction and the lateral direction refer to the directions parallel to the longitudinal axis and the lateral axis, respectively, of the odor applicator 150*e*.

Figure 11:
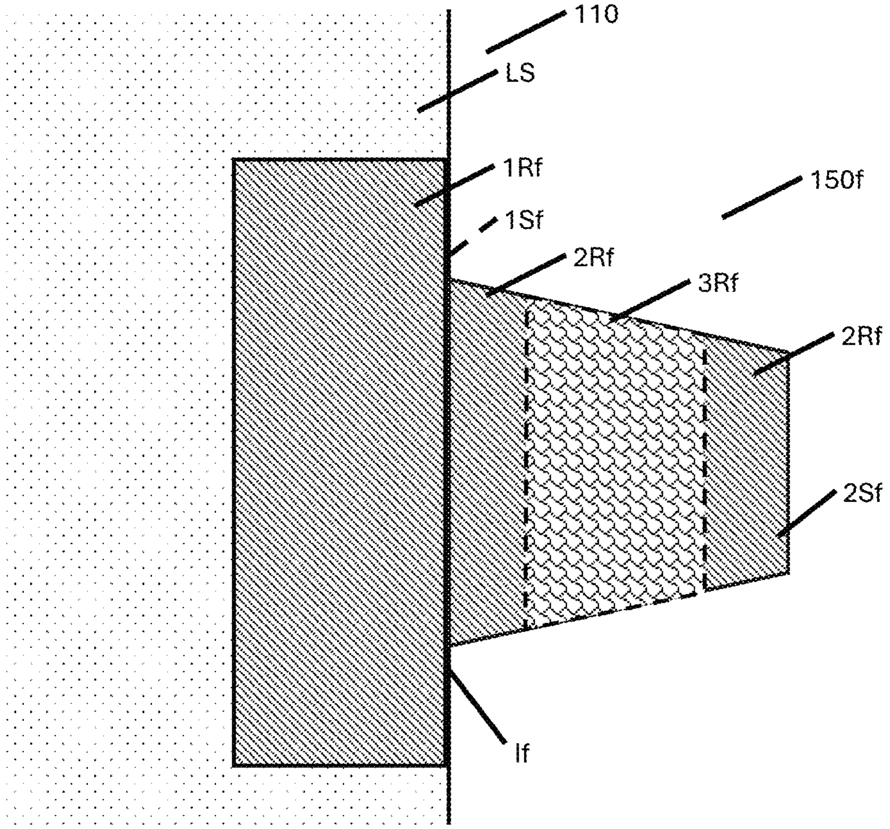
FIG. 11 illustrates a sixth example of an odor applicator according to the embodiments of the present disclosure.

FIG. 11 illustrates a sixth example of an odor applicator 150*f* according to the embodiments of the present disclosure. The odor applicator 150*f* may include a first surface 1Sf (not visible in FIG. 11) attached to the lower surface LS of the pad body 110 and a second surface 2Sf (visible in FIG. 11). The odor applicator 150*f* may include a first region 1Rf, a second region 2Rf, and a third region 3Rf. The first region 1Rf and the second region 2Rf may be formed of a laminated non-woven material. In the first region 1Rc, the first surface 1Sf may be bonded to the pad body 110 using a heat stamping technique. More particularly, the laminated non-woven material of the first region 1Rf may be placed between two layers of the pad body (e.g., a polyester layer and a non-woven layer) and secured with heat stamping and adhesives. The second region 2Rf and the third region 3Rf may extend beyond the perimeter of the pad body 110. In embodiments, the first surface 1Sf or the second surface 2Sf of the odor applicator 150*f* may function as an odor transfer layer 150*f*. In embodiments, in the third region 3Rf, the first surface 1Sf or the second surface 2Sf may be provided with hook and loop fasteners such as polypropylene hooks for removable attachment to the upper surface US (not illustrated in FIG. 11) of the pad body 110. The portion of the odor applicator 150*f* including the second region 2Rf and the third region 3Rf may be cut or torn along the interface If to separate it from the lower surface LS of pad body 110 and facilitate attachment to the upper surface US of the pad body 110 to attract a pet.

The first region 1Rf of the odor applicator 150*f* may have a width of 26 mm and a length in the longitudinal direction of 60 mm. The portion of the second region 2Rf interfacing with the first region 1Rf may have a width of 10 mm and a length in the longitudinal direction of between 35 and 40 mm. The third region 3Rf may have a width of 20 mm and a length in the longitudinal direction of between 35 and 25 mm. The portion of the second region constituting the distal end of the odor applicator 150*f* may have a width of 10 mm and a length in the longitudinal direction of 25 mm. Here, it will be understood that the longitudinal direction refers to the direction parallel to the longitudinal axis of the odor applicator 150*f*.

While various configurations of the odor applicator 150 according to the embodiments of the present disclosure have been described herein, it will be understood that the odor applicator 150 according to the embodiments of the present disclosure is not limited to any one configuration and may be modified. For instance, the location and type of adhesives, and methods of attaching and removing the odor applicator 150 to the pad body 110 may be suitably modified. For instance, in embodiments, in the initial state, the odor applicator 150 may be attached to the pad body using a permanent adhesive, repositionable adhesive, removable adhesive, heat stamping, pressure stamping, fasteners (e.g., hook and loop, polypropylene hooks) or the like. The adhesive may be provided on any surface of the odor applicator 150 or the pad body 110. The adhesive may be configured to remain with the odor applicator 150 after removal or remain on the pad body 110. The odor applicator 150 may be removed from the pad body 110 by tearing, cutting, ripping along a perforated interface, peeling off of adhesive, separating hook and loop fasteners, or any combination thereof. Similarly, the odor applicator 150 may be attached to the upper surface of the pad body 110 to attract a pet using adhesive, fasteners (e.g., hook and loop, polypropylene hooks) or any combination thereof.

As described herein, aspects of the disclosure relate to a pet training pad device having a pad body and an odor applicator removably attached to the pad body. The pad body may have an absorbent layer for absorbing and retaining a target odor from a target substance. As an example, the target substance may include urine produced by the pet, and the target odor may include the urine odor of the urine produced by the pet. The odor applicator may have an odor transfer layer for transferring the target odor to the pad body. For instance, the odor transfer layer may be an absorbent layer for absorbing urine that has been deposited by the pet on another surface. The odor applicator may be removed from the pad body, used to collect the target substance (e.g., from the floor or another training pad), and then brought into contact with the pad body to transfer the target odor from the target substance to the absorbent layer of the pad body. The odor applicator may be attached to a region of the pad body via an adhesive or the like.

According to the pet training pad device described herein, it is possible to transfer a target odor (e.g., a urine odor) from a target substance (e.g., urine produced by the pet) to the pad body using the odor applicator removably attached to the pad body. In this way, a pet's natural instinct to perform elimination in areas associated with the odor of their own excrement may be leveraged to train pets to perform elimination on the pad body, thereby reducing the occurrence of accidents and need for cleanup while facilitating hygienic waste management.

DEFINITIONS

The following includes definitions of selected terms employed herein. The definitions include various examples or forms of components that fall within the scope of a term and that may be used for implementation. The examples are not intended to be limiting. Both singular and plural forms of terms may be within the definitions.

An "operable connection," or a connection by which entities are "operably connected," is one in which signals, physical communications, or logical communications may be sent or received. Typically, an operable connection includes a physical interface, an electrical interface, or a data interface, but it is to be noted that an operable connection may include differing combinations of these or other types of connections sufficient to allow operable control. For example, two entities can be operably connected by being able to communicate signals to each other directly or through one or more intermediate entities like a processor, operating system, a logic, software, or other entity. Logical or physical communication channels can be used to create an operable connection.

To the extent that the term "includes" or "including" is employed in the detailed description or the claims, it is intended to be inclusive in a manner similar to the term "comprising" as that term is interpreted when employed as a transitional word in a claim. Furthermore, to the extent that the term "or" is employed in the detailed description or claims (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995).

While example systems, methods, and so on, have been illustrated by describing examples, and while the examples have been described in considerable detail, it is not the intention of the applicants to restrict or in any way limit scope to such detail. It is, of course, not possible to describe every conceivable combination of components or methodologies for purposes of describing the systems, methods, and so on, described herein. Additional advantages and modifications will readily appear to those skilled in the art. Therefore, the invention is not limited to the specific details, the representative apparatus, and illustrative examples shown and described. Thus, this application is intended to embrace alterations, modifications, and variations that fall within the scope of the appended claims. Furthermore, the preceding description is not meant to limit the scope of the invention. Rather, the scope of the invention is to be determined by the appended claims and their equivalents.

What is claimed is:

1. A pet training pad device comprising:

a pad body having at least an absorbent layer for absorbing a target odor from a target substance; and an odor applicator removably attached to the pad body and having at least an odor transfer layer for transferring the target odor to the pad body, wherein:

the odor applicator is configured to be removed from the pad body, collect the target substance on the odor transfer layer, and contact the absorbent layer of the pad body to transfer the target odor from the target substance to the absorbent layer of the pad body, in an initial state before removal from the pad body, the odor applicator is removably attached on an upper surface or a lower surface of the pad body;

the odor transfer layer includes an absorbent layer that is absorbent with respect to the target substance, and the odor transfer layer is formed from a material having a porous structure configured to allow passage and absorption of animal waste.

2. The pet training pad device according to claim 1, wherein the target substance includes a substance produced by a pet.

3. The pet training pad device according to claim 2, wherein the target substance includes pet urine produced by the pet.

4. The pet training pad device according to claim 1, wherein the odor applicator further comprises:

a first surface provided with an attachment layer for attaching to the pad body; and a second surface opposite the first surface provided with the odor transfer layer.

5. The pet training pad device according to claim 4, wherein in an initial state the first surface of the odor applicator is removably attached to the pad body such that the attachment layer shares an interface with an upper surface or a lower surface of the pad body.

6. The pet training pad device according to claim 4, wherein the attachment layer is configured to attach to the pad body using one or more attachment techniques selected from the group consisting of: adhesives, hook and loop fasteners, polypropylene hooks, and heat stamping.

7. The pet training pad device according to claim 4, wherein in an initial state a longitudinal edge of the odor applicator is removably attached to a peripheral edge of the pad body along a separable interface.

8. The pet training pad device according to claim 4, wherein:

the first surface of the odor applicator is configured to be removed from the pad body along the attachment layer;

the odor applicator is configured to collect the target substance on the odor transfer layer from a substance source external to the pad body; and the odor applicator is configured to be reattached to an upper surface of the pad body using the attachment layer such that the first surface of the odor applicator shares an interface with the upper surface of the pad body and the second surface of the odor applicator faces upward.

9. The pet training pad device according to claim 1, wherein the odor applicator includes a wetness indicator configured to change color when brought into contact with the target substance.

10. The pet training pad device according to claim 8, wherein the odor applicator is configured to be reattached to a central region of the upper surface of the pad body after collecting the target substance.

11. The pet training pad device according to claim 8, wherein when reattached to the upper surface of the pad body, the odor applicator has a height in a vertical direction perpendicular to the upper surface of the pad body that achieves a predetermined height threshold.

12. The pet training pad device according to claim 1, wherein the odor applicator has a brightness value (L*) ranging from 0 to 100, a green-red component (a*) value of 0, and a blue-yellow component (b*) value ranging from −128 to 0 in an L*a*b color system.

13. The pet training pad device according to claim 1, wherein the odor applicator has a brightness value (L*) ranging from 0 to 100, a green-red component (a*) value of 0, and a blue-yellow component (b*) value ranging from 0 to 128 in an L*a*b color system.

14. The pet training pad device according to claim 1, wherein the pad body and the odor applicator are disposable.

15. A pet training pad device use method for a pet training pad including:

a first pad body having at least an absorbent layer for absorbing a target odor from a target substance; and a first odor applicator removably attached to the first pad body and having at least an odor transfer layer for transferring the target odor to the first pad body, wherein:

in an initial state before removal from the pad body, the first odor applicator is removably attached on an upper surface or a lower surface of the pad body, the odor transfer layer includes an absorbent layer that is absorbent with respect to the target substance, and the odor transfer layer is formed from a material having a porous structure configured to allow passage and absorption of animal waste, the pet training pad device use method comprising:

collecting, using a second odor applicator, a target substance on the odor transfer layer of the second odor applicator from a substance source; and bringing the second odor applicator into physical contact with the absorbent layer of the first pad body to transfer the target odor from the target substance to the absorbent layer of the first pad body.

16. The pet training pad device use method according to claim 15, wherein:

the first odor applicator is removed from the first pad body and used as the second odor applicator to collect the target substance.

17. The pet training pad device use method according to claim 15, wherein:

the second odor applicator is an odor applicator different from the first odor applicator and is removed from a second pad body different than the first pad body to collect the target substance.

18. The pet training pad device use method according to claim 15, wherein:

the odor applicator further comprises:

a first surface provided with an adhesive layer; and a second surface opposite the first surface provided with the odor transfer layer, in an initial state the first surface of the odor applicator is removably adhered to the pad body such that the adhesive layer shares an interface with a lower surface of the pad body; and bringing the odor applicator into physical contact with the absorbent layer of the pad body includes attaching the odor applicator to the absorbent layer of the pad body using the adhesive layer such that the first surface of the odor applicator shares an interface with the upper surface of the pad body and the second surface of the odor applicator faces upward.

* * * * *